United States Patent [19]

Berrebi

[11] Patent Number: 4,530,917
[45] Date of Patent: Jul. 23, 1985

[54] PROCESS OF PRESULFURIZING CATALYSTS FOR HYDROCARBONS TREATMENT

[75] Inventor: Georges Berrebi, Valence, France

[73] Assignee: Eurecat - Societe Europeenne de Retraitement de Catalyseurs, La Voulte sur Rhone, France

[21] Appl. No.: 575,597

[22] Filed: Jan. 31, 1984

[30] Foreign Application Priority Data

Jun. 30, 1983 [FR] France .................. 83 11048

[51] Int. Cl.$^3$ .............. B01J 27/02; B01J 31/02; B01J 37/00
[52] U.S. Cl. ............................ 502/220; 502/168; 502/216; 502/219; 502/221; 502/31; 502/22; 502/222; 502/223
[58] Field of Search ........... 502/168, 216, 220, 219, 502/221, 31, 22, 222, 223

[56] References Cited

U.S. PATENT DOCUMENTS

| | | | |
|---|---|---|---|
| 2,402,626 | 6/1946 | Howk | 502/216 X |
| 2,620,362 | 12/1949 | Stiles | 502/220 X |
| 2,883,440 | 4/1959 | Roley | 502/168 X |
| 3,219,638 | 11/1965 | Warner | 502/168 X |
| 3,337,446 | 8/1967 | Engebretson et al. | 502/216 X |
| 3,715,404 | 2/1973 | Lindlar et al. | 502/168 X |
| 3,732,155 | 5/1973 | Cecil et al. | 208/210 |
| 4,098,682 | 7/1978 | O'Hara | 208/216 R |
| 4,132,632 | 1/1979 | Yu et al. | 208/216 PP |
| 4,172,027 | 10/1979 | Ham et al. | 502/53 X |
| 4,334,982 | 6/1982 | Jacquin et al. | 502/220 X |
| 4,341,625 | 7/1982 | Tamin | 208/216 PP |
| 4,443,330 | 4/1984 | Nongbri | 502/219 X |
| 4,474,896 | 10/1984 | Chao | 502/216 |

FOREIGN PATENT DOCUMENTS

| | | | |
|---|---|---|---|
| 56-120626 | 9/1981 | Japan | 502/168 |
| 1051003 | 12/1966 | United Kingdom | 502/168 |

Primary Examiner—D. E. Gantz
Assistant Examiner—William G. Wright
Attorney, Agent, or Firm—Millen & White

[57] ABSTRACT

Catalysts for the treatment of hydrocarbons are presulfurized or presulfided ex-situ, in the absence of hydrogen, by means of a polysulfide of the general formula $R-S_{(n)}-R'$ wherein n is an interger from 3 to 20 and R and R' are each an organic radical having from 1 to 150 carbon atoms, R' being optionally a hydrogen atom, the so-presulfurized or presulfided catalysts being subsequently activated with hydrogen during their use in the hydrotreatment process of a hydrocarbon charge, i.e. in-situ. An aldehyde or an alcohol or a ketone, an ether or an organic acid, may be added, as promoter, to the polysulfide.

11 Claims, No Drawings

PROCESS OF PRESULFURIZING CATALYSTS FOR HYDROCARBONS TREATMENT

It is often desirable to employ the step or sulfurization (generally called "presulfurization" or "presulfining" of metals forming part of the composition of certain catalysts for refining and/or hydroconverting hydrocarbons, either in the case of fresh (new) catalysts or of catalysts at the end of their regeneration step before they are re-used.

A presulfurization of new fresh or regenerated catalyst is thus desirable in view of the use of these catalysts in refining reactions, for example in reactions of desulfurization of various gasolines, for example gasolines from catalytic cracking or steam-cracking which, before being used, are conveniently subjected to a treatment for reducing their sulfur content without modification of their octane number or with the least possible modification thereof. Such desulfurizing reactions are generally effected in the presence of hydrogen, between 200° and 400° C., under a pressure for example from 5 to 60 bars, with a space velocity (expressed in m$^3$ of introduced liquid charge per m$^3$ of catalyst and per hour) from 0.5 to 15, with a hydrogen partial pressure from 4 to 60 bars, the charge being for example a gasoline distilling generally between 30° and 220° C. and having optionally a bromine number from 40 to 80 (g/100 g), containing about 15 to 45% by volume of olefins (essentially monoolefins together with small amounts of diolefins) and 15 to 25% of aromatic hydrocarbons.

The catalyst used for this type of hydrodesulfurization contains a carrier, generally non acid, for example an alumina or alumina mixtures (U.S. Pat. No. 4,334,982) or any other convenient carrier with, as basic material, at least one metal or metalloid oxide (magnesia (U.S. Pat. Nos. 4,132,632, 4,140,626), silica, silica-magnesias, silica-aluminas, boron aluminas, clays, coals, fluorinated aluminas or silicas) this or these carrier mixtures being possibly at least partly in amorphous state or in crystallized state (zeolites) and the catalyst further containing 0.2 to 30% of at least one active metal from groups VI, VIII or another one selected for example from the group consisting of cobalt, molybdenum, nickel and tungsten (U.S. Pat. Nos. 3,732,155 and 3,804,748). Generally, a pair of two such metals is used, for example one of the pairs cobalt-molybdenum, nickel-molybdenum, cobalt-tungsten, tungsten-molybdenum, cobalt nickel, nickel-tungsten. It is still possible, by way of example, to make use of a noble metal of group VIII of the platinum family: Pt, Pd ... U.S. Pat. No. 4,098,682.

Thus before being used, the catalyst, new or regenerated, is subjected generally, according to the prior art, to a sulfurization (presulfurization) effected in a hydrodesulfurization reactor. This sulfurization provides for the inclusion into the catalyst of, for example, 50 to 110% about of the stoichiometrical sulfur amounts calculated from the sulfide amounts of the formulas (depending on the involved metals) $Co_9S_8$, $MoS_2$, $WS_2$ and $Ni_3S_2$.

This sulfurization (presulfurization) is effected, in the prior art, at a temperature close to or higher than the reaction temperature selected for the hydrodesulfurization reaction (thus higher than 180° C. and more particularly above 250° C.), during a few hours, by means of a hydrogen sulfide mixture, generally diluted in hydrogen (proportion of hydrogen sulfide in hydrogen from about 0.5 to 5% by volume) with a convenient space velocity, for example of about 1,000 to 3,000 liters of gas, under normal conditions of temperature and pressure, per liter of catalyst and per hour (U.S. Pat. No. 4,334,982). The sulfurization (or presulfurization) itself may be effected at successive temperature levels (French Pat. No. 2476.118

Various sulfurization agents other than hydrogen sulfide ($H_2S$) can be used, for example a sulfurized compound of the mercaptans family, carbon sulfide ($CS_2$), sulfides or disulfides, thiophenic compounds and, preferably, dimethylsulfide (DMS) and dimethyldisulfide (DMDS).

A sulfurization or presulfurization of the regenerated catalyst is also desirable for the reactions of hydrocarbon hydroreforming (particularly reforming of a naphtha) and the production of aromatic hydrocarbons ("Aromizing"), for example the production of benzene, toluene, xylenes (ortho, meta or para), either from unsaturated or saturated gasolines (for example gasolines obtained by pyrolysis, cracking, particularly steam-cracking, or catalytic reforming), or still from naphthenic hydrocarbons liable to be converted by dehydrogenation to aromatic hydrocarbons.

The general conditions of these reactions are usually the following: average temperature from 400° to 600° C., pressure from 1 to 60 bars, hourly velocity from 0.1 to 10 volumes of liquid naphtha per volume of catalyst and recycle rate from 0.5 to 20 moles of hydrogen per mole of charge.

The catalyst may contain, for example, at least one metal of the platinum family, i.e. one noble metal such as platinum, palladium, iridium, rhodium, ruthenium, osmium, deposited on a convenient carrier (alumina, silica, silica-alumina, fluorinated aluminas, fluorinated silicas, zeolite, etc ... or mixtures of such carriers). The total noble metals content is for example from 0.1 to 5% by weight with respect to the catalyst. The catalyst may also contain generally at least one halogen (chlorine, fluorine, etc ... ) in a proportion by weight from 0 to 15%. Still optionally, the catalyst contains at least one promoter metal selected from the most various groups of the periodic classification of elements, the content by weight of said promoter metal varying for example from 0.1 to 15%. Such promoter metals are metals from groups VIII, VI A and VI B, I B and II B, III A, IV A, V A and V B, IV B, III B, I A and I B as well as the metals of the lanthanide family: in addition to the group VIII metals, either noble or not, the following are to be more particularly mentioned: copper, silver, gold, germanium, tin, indium, thallium, manganese, rhenium, tungsten, molybdenum, niobium and titanium.

For these reactions of catalytic reforming or aromatic hydrocarbons production, the sulfurization of the new or regenerated catalyst is accompanied with a reduction with hydrogen of the catalyst and is effected at the top of the reactor or at the vicinity thereof. The temperature in the sulfurization zone is set in relation with the temperature at which is performed the reduction, i.e. generally between 480° and 600° C., in most cases. The difficulty of effecting this type of sulfurization in situ, i.e., in the vicinity of the reactors, has resulted in time-consuming sulfurization procedures although they are efficient (U.S. Pat. No. 4,172,027).

The sulfurization agent, in the prior art, is hydrogen sulfide either pure of diluted with hydrogen or with gaseous hydrocarbons, or dimethyldisulfide diluted with hydrogen or with other sulfurized compounds such as alkyl sulfides or alkylmercaptans, diluted with hydrogen. The operating pressure is that prevailing in the reforming reactor or in the reactor for producing aromatic hydrocarbons, the reaction time varying from a few minutes to a few days according to the selected operating conditions (see U.S. Pat. No. 4,172,027)

The process for sulfurizing (presulfurizing) a new or regenerated catalyst would still be convenient in some cases for the partial or total sulfurization of a catalyst also containing as basic material one of the already mentioned carriers and at least one of the above-mentioned active metals, adapted to be used in reactions of hydrocarbon conversions, as, for example, the hydrogenation, dehydrogenation, alkylation, hydroalkylation, dealkylation, hydrodealkylation, steam dealkylation, isomerization reactions and, in particular, hydrodemetallation of heavy charges.

The sulfurization or presulfurization, when required, may avantageously be effected according to any one of the above-mentioned prior art techniques.

The metals of the catalysts used in refining, hydrorefining or in petrochemistry, either new or regenerated, are in most cases used as oxides, sometimes as metals (for certain metals of reforming catalysts in particular). Now, since the metals of these catalysts are often active only in sulfurized or at least partially sulfurized state, it is hence necessary for the refiner or petrochemist to proceed to a sulfurization of the catalyst before using it.

Today, the regeneration of the catalysts is more and more effected by a specialist of catalyst regeneration, sometimes at a location far from the industrial unit. It seems on the contrary reasonable to try to forward to the refiner a product ready for use, this being possible by the original and efficient process according to the invention, wherein a sulfurized compound is incorporated to the catalyst mass, said compound producing the sulfurization or presulfurization of the catalyst when, subsequently, in the reaction zone (zone of the charge treatment) or in the immediate vicinity thereof, the catalyst will be contacted with hydrogen. Of course, the incorporation of said sulfurized compound may, if so desired, be effected at the vicinity of the industrial unit or even at the place of the catalyst treatment; the process for incorporating said sulfurized compound may be conducted ex situ also with a new or regenerated catalyst, before its use in the industrial unit.

In a more precise manner, the process for catalyst sulfurization is hence characterized by a preliminary step of incorporation into the catalyst mass of a sulfurized compound of particular type.

The preliminary step of introducing a sulfurized compound according to the invention, which will be arbitrarily called "ex situ" pretreatment, irrespective of the place where it is carried out, either in the vicinity of the industrial unit or geographically at a more or less great distance from the industrial unit (at the place where it has been regenerated or where it has been manufactured for example) is, in any way, no longer conducted at the immediate vicinity of the reactor (arbitrarily referred to as "in situ" i.e. at the top of the reactors or of zones more or less in direct communication with these reactors, requiring to proceed under the operating conditions (of temperature, pressure or others), made necessary at least in part by the operating conditions in the reactors themselves or in accessory parts thereof (e.g. zone for catalyst preliminary hydrogenation).

To summarize, the invention concerns a process whereby, when the catalyst will be subjected, as soon as it is used "in situ", to the conventional activation reaction in the presence of hydrogen, (generally above 100° C.) it will be possible then to proceed, by means of the hydrogen present "in situ", to the sulfurization at the required rate, stoichiometrical or non stoichiometrical, of the one or more active metals included in the catalyst composition. The process consists of incorporating, in the absence of hydrogen, into the new or regenerated catalyst pores, at least one sulfurization agent of the general formula

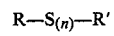

wherein R, R' and n are defined below,

The sulfurization of the catalyst may be carried out as it follows. In a first spep, conducted "ex situ" in the absence of hydrogen, the catalyst is treated with at least one sulfurization agent so as to incorporate partially or completely said agent into the catalyst pores, the sulfurization agent being a polysulfide of the general formula:

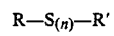

wherein is an integer from 3 to 20, R is an organic radical containing from 1 to 150 carbon atoms per molecule, selected from the group consisting of alkyl radicals i.e. saturated or unsaturated, linear or branched or of the naphthenic type, the alkyl radicals, the alkylaryl radicals and the arylalkyl radicals, and where R' is either a hydrogen atom or an organic radical, defined as R, identical to or different from R, said sulfurization agent being used in solution in a solvent; in a second step, conducted "in situ", and preferably at a temperature above 150° C., the activation step of the catalyst is effected in the presence of hydrogen, the required sulfur amount being fixed, by the action of hydrogen, on the one or more metals included in the composition of said catalyst.

The disadvantages of the conventional method of "in situ" sulfurization are as follows:
  too high an operating temperature,
  use of malodorous and toxic products ($H_2S$, $CS_2$, DMS or DMDS),
  possibility of deactivating the metal by reduction of the oxides before their sulfurization,
  impossibility to use charges containing olefins in order to avoid any polymerization,
  difficulty of treating heavy charges of the vacuum distillate or the residue type in view of their low wetting power due to their high viscosity,
  time consuming sulfurization (several hours to several days).

The advantages of the preliminary treatment of incorporating a sulfurized compound "ex situ", according to the invention, are on the contrary as follows:
  relatively low operating temperature (60° to 200° C.),
  complete and homogeneous sulfurization of the catalyst or, on the contrary, sulfurization or sulfining at the exact required sulfurization rate,
  not liable to give rise to a reduction of the oxidized metals since, according to the invention, the treatment is effected in the absence of hydrogen,
  easy handling of the catalysts which are made non pyrophoric by addition of water and/or of a light gasoline,
  no bad smell and no toxicity,
  possibility of using the catalyst in any dense loading method, time saving for the refiner and for the catalyst user, maximum activity obtained as soon as the reactor is fed with the charge to be desulfurized.

The researches effected in the field of the invention have led to the development of an "ex situ" sulfurization method of new or regenerated catalysts, method which has the advantage of substantially limiting the industrial structures which were required for the prior art presulfurization techniques.

The object of this invention is hence to conduct "ex situ" the presulfurization of catalysts by incorporating all the necessary sulfur amount and only the necessary sulfur amount required by the user. The catalysts are thus delivered to the refinery or to any other unit in adequate state in an order to be presulfided.

The refiner, or any other user, will thus have only to reactivate this catalyst in the presence of hydrogen at a temperature of, for example, from 100° to 200° C. for a desulfurization catalyst, from 400° to about 600° C. for a catalytic reforming catalyst or a catalyst for the production of aromatic hydrocarbons, in order to cause sulfur to react with the contained metals and immediately start the refining or hydrocarbon conversion reaction by introducing the charge to be treated.

The process for catalyst sulfurization or presulfurization according to the invention is hence characterized by a pretreatment of the catalyst, by means, as sulfurization agent, of at least one polysulfide of the formula:

$$R-S_{(n)}-R'$$

wherein n is an integer from 3 to 20, preferably from 3 to 8 and more particularly from 3 to 7, and wherein R and R', identical or different, represent organic radicals each containing 1 to 150 carbon atoms per molecule, preferably 10 to 60 carbon atoms and, more particularly, 15 to 30, these radicals being selected from the group consisting of alkyl radicals, i.e. saturated or unsaturated, linear or branched or of the naphthenic type, aryl radicals, alkylaryl radicals and arylalkyl radicals, these various radicals optionally comprising at least one heteroatom, R' being also optionally hydrogen atom. The preparation of the polysulfides to be used according to the invention does not involve any particular difficulty and has been described in the litterature, particularly in the French Pat. Nos. 1,381,265 and 1,437,053.

A preferred example of polysulfide is the ditert-dodecylpolysulfide (n=5) of formula:

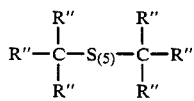

wherein R" is a dodecyl radical.

This product is sold on the trade for example by Elf Aquitaine under reference TPS 32, in view of the fact that it contains about 32% by weight of sulfur.

Another example of polysulfide is ditert-nonylpolysulfide (n=5) of the formula:

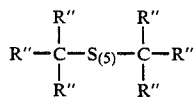

wherein R" is a nonyl radical

This product is sold on the trade by Elf Aquitaine under reference TPS 37 in view of the fact that it contains about 37% by weight of sulfur and it is sold also by PENNALT under reference TNPS.

Depending on the process conditions, it is obviously possible to make use of these sulfurizing agents of the polysulfide type either alone or as mixture in judiciously selected proportions.

The process according to the invention of sulfur incorporation into the catalyst is conducted in the absence of hydrogen and provides with high accuracy for the total or partial sulfurization rate required by the user. This sulfur incorporation is effected at a temperature from 0° to 50° C., preferably from 10° to 35° C. and more preferably at room temperature.

The sulfurization agent according to the invention makes to possible to increase the filling density of the catalyst pores, generally by at least 20%, since the molecules of these sulfurization agents, whose size ranges from 5 to 30 Angströms, are sufficiently large to completely or partially block the pores of this type of catalyst whose size is generally from 5 to 70 Angströms (microporosity). The sulfurization according to the invention thus provides for the fixing on the catalyst, with a high accuracy, by dilution with the selected solvent, of the convenient sulfur amount, for example the stoichiometrical amount for the hydrodesulfurization catalysts and non stoichiometrical but critical amounts for the reforming catalysts or the catalysts for producing aromatic hydrocarbons, these critical amounts depending on the type of metal or on each of the metals forming part of the catalyst composition. (It is known that sulfur is a poison for the reforming catalyts and hence it is necessary to completely control the exact amount of incorporated sulfur, this being precisely possible by the process of the invention). The present process thus provides for a sulfurization rate adapted to the desired rate of the catalyst user. The sulfurization agent, as used, is diluted in a convenient solvent which depends in particular on the type of sulfurization agent, i.e. on R or R', radicals which determine the sulfur content incorporated into the catalyst, generally by capillarity or by porosity. The sulfurization processes vary in fact according to the cuts to be subsequently treated in the presence of the catalysts treated according to the invention. The selected solvent may thus be one of the following solvents used either alone or as mixture:

- a light gasoline boiling for example between about 60° and 95° C.,
- a gasoline of the hexane type boiling between about 63° and 68° C.,
- a gasoline of the F type boiling between about 100° and 160° C. and generally containing from 10 to 20% of aromatic hydrocarbons, for example 15% (by volume),
- a gasoline of the "white spirit" type boiling between about 150° and 250° C. and generally containing from 14 to 22% of aromatic hydrocarbons, for example 17% by volume, or
- any other hydrocarbon or non hydrocarbon cut, equivalent to the preceding gasolines.

Thus, in conformity with the invention, there is used as sulfurization agent, a particular sulfurized compound which will be blocked as soon as it is introduced in the catalyst mass. Subsequently, "in situ" that is on the site or in the vicinity thereof (where the catalyst will be used for the treatment of various charges), during the conventional activation reaction effected in the presence of hydrogen, the sulfurization agent introduced into the catalyst in predetermined amounts will give rise to hydrogen sulfide which, in the presence of hydrogen, will give the one or more desired sulfides of the one or more metals present in the catalyst, according for example to the following exothermic reactions (1) (2) and (3) concerning, by way of examples, molybdenum, cobalt and nickel sulfurizations:

$$MoO_3 + 2H_2S + H_2 \rightarrow MoS_2 + 3H_2O + Q \quad (1)$$

$$9CoO + 8H_2S + H_2 \rightarrow Co_9S_8 + 9H_2O + Q \quad (2)$$

$$3NiO + 2H_2S + H_2 \rightarrow Ni_3S_2 + 3H_2O + Q \quad (3)$$

The use of a suitable solvent, wherein the sulfurization agent is dissolved, makes it possible to vary the latent vaporization heat of the selected solvent, hence to absorb at least a portion of the heat evolved during the sulfurization reaction.

At the end of the sulfur deposit at least a portion of the solvent remains in the catalyst but it is not necessary to remove this solvent (by stripping with liquid nitrogen for example or by any other means). This solvent remaining in the catalyst will be later removed without any damage, in the reactor where the catalyst is used, i.e. "in situ".

Another advantage of the "ex situ" process according to the invention, is that it is not necessary to make use immediately of hydrogen, thus avoiding the requirement of handling this gas. Hydrogen, of course, is necessary subsequently to proceed to the catalyst activation but this activation is effected "in situ" since, in any way, the use of hydrogen is generally necessary "in situ" for the treatment of the cuts in the presence of the presulfurized catalyst according to the invention. It has been observed, in relation with this subject, that the activation of the presulfurized catalyst according to the invention gives particularly advantageous results when adding to the hydrogen about 0.1 to 1% of water by volume.

The following tests, given by way of non limitative illustrations, will be useful for a better understanding of the interest of the invention.

It will be further stated that, generally, the presulfurization of the catalyst may be effected on a new or regenerated product, that said presulfurization is thus effected by adsorption of a stoichiometrical amount, with respect to the metals, of polysulfides of high sulfur content, that the adsorption of this polysulfide is made easier by dilution in a solvent and particularly in white spirits. The volume of polysulfide and of the selected solvent amount preferably to a value equal to the pore volume of the catalyst bed to be treated: thus, by way of example, for 100 g of regenerated or new catalyst (oxidized form), the purpose is to introduce about 9 grams of sulfur as polysulfide in about 45 cc of the total mixture polysulfide plus solvent (white spirits for example). The adsorption of said polysulfide is generally effected in ambient air. The catalyst may then be optionally dried in a hot air stream between 50° and 150° C. (for example at 100° C.) then conditioned to be shipped or forwarded, according to a preferred method, to the refinery.

The activation is then conducted by the refiner in the reactor where is placed the so-presulfurized catalyst charge.

The bed may be purged with hot nitrogen to remove any oxygen gas during the storage or the transportation of the catalyst. In the reactor of the refinery, just before feeding the charge to be treated for starting the activation, it is thus possible to pass a hydrogen stream for example at 150° C., at a hourly rate corresponding for example to at least 40 times the volume of the catalyst bed.

The temperature will slightly increase as a result of the exothermicity; the generated gas mixture (mixture $H_2$ + generated $H_2S$) will optionally be recycled and may be used to reduce the temperature increase. The temperature must be preferably higher than 100° C., in order to avoid any condensation of liquid and lower than 200° C. for avoiding any possible overheating.

The sulfurization rate is followed by controlling the temperatures, the variation of the $H_2S$ content, the water amount collected in the purge gas after condensation (at the separation drum).

The main advantages of the process are listed again below:

sulfurization effected at low temperature;
easy handling of the catalyst avoiding the use of malodorous sulfides the polysulfides being completely odorless and having no toxicity;
more homogeneous sulfurization of the catalyst bed;
possibility of using the under-structures of the "ex situ" catalyst regeneration plants;
limited industrial under-structure;
no storage of difficulty usable sulfurized product such as DMDS;
reduction of the non operating time of the reactors;
no liability of metal reduction which gives rise to hydrocracking reactions and not to the desired and generally selectively favoured hydrodesulfurization reactions;
in the case of hydrorefining heavy cuts, in view of their hydrocracking or demetallation, the refiner is often obliged to presulfurize the catalyst by making use of a light charge which must then be stored. In the case of this invention, it will no longer be necessary to proceed in such a complicated manner, since the catalyst will be already sulfurized at the time of feeding the charge to be treated.

It has also been discovered, and this is an other object of the present invention, a means for speeding up, at a later stage during the catalyst reaction with hydrogen, the conversion of the active metal oxides to metal sulfides.

This means consists in the "ex situ" incorporation of a polysulfide into the catalyst pores, in the presence of at least one additive having reducing properties and which is selected from the group consisting of aldehydes containing 4 to 14 carbon atoms per molecule (preferably 5 to 12 carbon atoms), ketones or polyketones containing 3 to 18 (preferably 5 to 12) carbon atoms per molecule, ethers containing 5 to 14 (preferably 6 to 12) carbon atoms per molecule, alcohols or polyalcohols containing 5 to 14 carbon atoms (preferably 6 to 12) per molecule and organic acids or polyacids containing 3 to 14 carbon atoms (preferably 6 to 12) per molecule.

The additive or additives will be advantageously used in a proportion of 0.4 to 8%, preferably 0.8 to 4% and more particularly 0.9 to 3%, with respect to the weight of polysulfide or polysulfides.

The one or more additives may be added, for example, to the solution of the one or more polysulfides, either pure or dissolved in a suitable solvent. This solvent may be of the same type as the solvent used for dissolving the polysulfide, i.e. for example:
- a light gasoline boiling, for example, from about 60° to 95° C.,
- a gasoline of the hexane type boiling from about 63° to 68° C.,
- a type F gasoline boiling from about 100° to 160° C. and generally containing from 10 to 20%, e.g. 15% (by volume) of aromatic hydrocarbons,
- a gasoline of the "white spirits" type boiling from about 150° to 250° C. and generally containing 14 to 22%, e.g. 17%, by volume, of aromatic hydrocarbons,
- any hydrocarbon or non hydrocarbon cut, equivalent to the preceding gasolines.

The one or more additives according to the invention may be used in any other solvent such, for example, as alcohols (methanol, ethanol, propanol, etc...) or other inorganic or organic liquids known as dissolving the aldehydes, ketones, ethers, alcohols, polyalcohols, acids and polyacids used according to this invention.

Examples of aldehydes are: propanal, butanal, 2-ethylbutanal, 2-phenoxypropanal, 3-methylbutanal, 2-methylpentanal, 2-ethylhexanal, heptanal, octanal, nonanal, decanal, dodecanal, dimethyl acetal dodecanal, etc...

Examples of ketones are: acetone, 2-butanone, 3-methyl 2-butanone, 2-pentanone, 3-pentanone, 2-hexanone, 3,3-dimethyl 2-hexanone, 3,4-dimethyl 2-hexanone, 3-hexanone, 3,4-dimethyl 3-hexanone, 2,5-dimethyl 3-hexanone, 4,4-dimethyl 3-hexanone, 3-methyl 2-hexanone, 4-methyl 2-hexanone, 5-methyl 2-hexanone, 4-methyl 3-hexanone, 5-methyl 3-hexanone, 1-phenyl 1-hexanone, 2-heptanone, 3-heptanone, 2,6-dimethyl 4-heptanone, isopropyl 2-heptanone, 3-methyl 2-heptanone, 6-methyl 3-heptanone, 2-methyl 4-heptanone, 1-phenyl 1-heptanone, 2-octanone, 3-octanone, 4-octanone, 7-methyl 4-octanone, 2-nonanone, 4-nonanone, 5-nonanone, 2-decanone, 3-decanone, 4-decanone, 2-dodecanone, 1-phenyl 1-dodecanone.

Unsaturated aldehydes or ketones can be used as for example: 2-butenal, 2-hexenal, 3-pentene 2-one, 1-pentene 5,5-dimethyl 1-phenyl 3-one, 3-heptene 2-one, 5-heptene 2-one 6-methyl.

Examples of polyketones are: 2,3-butanedione (dimethylglyoxal); 2,3-pentadione; 2,4-pentadione (acetylacetone); 3,3-dimethyl 2,4-pentadione; 3-ethyl 2,4-pentadione; 2,5-hexanedione; 1,6-diphenyl 1,6-hexanedione; 2,2,5,5-tetramethyl 3,4-hexanedione; 2,4-heptanedione; 2,4,6-heptanetrione; 2,3-octanedione; 2,7-octanedione; 3,6-octanedione; 4,5-octanedione; 2,2,7,7-tetramethyl 3,6-octanedione; 1,4-diphenyl 2-butene 1,4-dione (ethyl diketone) etc...

Examples are ethers are: dimethyl ether, diethyl ether, methyl ethyl ether, methyl butyl ether, methyl t-butyl ether, 2-methylethyl hexyl ether, ethyl butyl ether, ethyl t-butyl ether, di n-propyl ether, isoamy ether, furan, tetrahydrofuran, dioxane, etc...

Examples of alcohols are: n-butanol, isobutanol, 1-pentanol, 2-pentanol, 2-methyl 4-butanol, 2-methyl 3-butanol, hexanols, methyl-pentanols, dimethyl-butanols, heptanols, octanols or amyl alcohols $C_5H_{11}OH$.

Examples of acids are those corresponding to the above-mentioned aldehydes, ketones and/or alcohols. Lactic acid and citric acid are to be mentioned particularly.

The additive, according to the present invention, by a synergistic effect wth the involved hydrogen, results in an increase, during the reduction step, the reduction rate of the metal oxides, so as to reduce these oxides much more quickly thus favoring the kinetics of replacing oxygen by sulfur and further favoring the dispersion of the metals in the catalyst.

Consequently, the specific reactions of refining and hydrocarbon conversion will start more quickly.

The effected tests had in particular the purpose of preparing a catalyst charge easy to handle and of reducing the investment cost in order to obtain a reasonable economical yield, of making use of the "ex situ" regeneration facilities and of saving refiners time, together with an easier re-use of the catalyst charge.

It must be recalled that the basic process for the catalyst sulfurization according to the invention is the same as in the prior art, i.e. involves the use of a mixture of hydrogen and hydrogen sulfide:

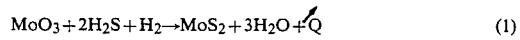  (1)

$$MoO_3 + 2H_2S + H_2 \rightarrow MoS_2 + 3H_2O + Q$$

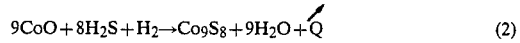  (2)

$$9CoO + 8H_2S + H_2 \rightarrow Co_9S_8 + 9H_2O + Q$$

  (3)

$$3NiO + 2H_2S + H_2 \rightarrow Ni_3S_2 + 3H_2O + Q$$

The sulfur source for producing $H_2S$ consists, according to the invention, of a particular sulfurized product (polysulfide) already present in the catalyst.

The principle of the invention consists of loading the catalyst with said sulfurized product (polysulfide). This is achieved by adsorption of this compound into the catalyst pores. The so-treated catalyst is subsequently activated in the reactor of the refinery by passing hydrogen heated at 80° C. (between 80° and 200° C.). The sulfurized product releases $H_2S$, the sulfurization of the oxides being then effected according to known techniques.

The sulfurized compound used to impregnate the catalyst is selected in relation with its molecular size; as a matter of fact, these do exist sulfurized compounds (polysulfides) whose sizes are a few Angströms, or tens of Angström, i.e. the size of the micropores of the alumina or silico alumina carriers.

A few tests have been made with a new catalyst KETJEN 165/1.5 E, roasted at 550° C., or HR 306 (PRO-CATALYSE).

Five sulfurization agents have been successively tested:
- DMS: dimethylsulfide
- nBM: n butyl mercaptan
- TNPS: diter-nonylpolysulfide of PENHALT (about 37% by weight of S)
- TPS 32: of ELF AQUITAINE (about 32% by weight of S)
- TPS 37: of ELF AQUITAINE (about 37% by weight of S)

The handling is conducted by immersing a given amount of catalyst in a reactant excess. The impregnation lasts one hour.

The so-treated catalyst is then brought for one hour in the air, to different temperatures: 80° C., 100° C. and 150° C., to determine the behaviour of the product at least at these temperatures.

The following results are obtained: (with TPS 37, the results were substantially equivalent to those obtained with TMPS).

| SAMPLE | | DMS | nBM | TNPS | TPS 32 |
|---|---|---|---|---|---|
| 80° C. | S | 0.88 | 3.12 | 10.60 | 9.56 |
| | C | — | — | 3.95 | 2.82 |
| 100° C. | S | — | 1.72 | 10.33 | 9.68 |
| | C | — | — | 3.74 | 2.40 |
| 150° C. | S | — | — | 3.49 | 2.33 |
| | C | — | — | 2.94 | 1.61 |

Only the polysulfides have a good behaviour at a high temperature. Their dissociation and accordingly their removal occurs however at 150° C.

Further tests have thus been effected with polysulfides, which have the additional advantage of being not very odorous, contrary to DMS or nBM. Moreover, the polysulfides have absolutely no toxicity, in contrast to the mercaptans or the organic sulfides.

Tests for perfecting the sulfurization process have been effected with TPS 32 and TNPS which are similar with respect to their sulfur content (about 32% by weight).

The polysulfides being very viscous and thick products, they have been diluted before use with a solvent which, in the present case, is white spirits (boiling temperature from 150° to 250° C.).

Sulfur is used in stoichiometrical amount to sulfurize the totality of the oxides ($MoO_3$, Co O) i.e. in the present case 7.5% of S.

For the adsorption of the whole polysulfide amount, the volume of reactant (polysulfide+solvent) must be equal to the volume of impregnation of the treated catalyst charge. This total pore volume, or impregnating volume, determines the amount of solvent to be used. In the present tests, this volume is 45 ml for 100 g of catalyst as an average (50% of solvent and 50% of polysulfide).

The diluted polysulfide is added to the cold test sample. A test is effected under nitrogen atmosphere, another one in ambient air.

The catalyst is then dried at 100° C., either in a nitrogen stream or in a stream of air.

The results obtained with the catalyst KETJEN K165/1.5E, treated with TNPS, are the following:

Loss on heating at 500° C. (L.O.H. at 500° C.)
 before treatment: 0.81%
 after treatment:
  nitrogen: 26.76%
  air: 25.52%

Analysis of carbon and sulfur on the impregnated catalyst.

| | BEFORE TREATMENT | AFTER TREATMENT | |
|---|---|---|---|
| | | nitrogen | air |
| S % | 0.38 | 7.97 | 8.57 |
| C % | 0.08 | 5.20 | 6.50 |

These results show (particularly the L.O.H. values at 500° C.) that the catalyst, either treated in air or in nitrogen, is impregnated as an average at 20% with TNPS (which contains about 37% of S) i.e. with 7.4% of sulfur by weight with respect to the dried and oxidized catalyst, which correspond to the desired restore.

The results obtained with TPS 32 or with TPS 37 are substantially equivalent.

The activation of the precedingly treated catalysts is effected by passing a hydrogen stream at 150° C. through a catalyst bed impregnated with polysulfide.

When the bed reaches 130° C., the reaction starts and the temperature increases to 135° C.

The catalyst becomes black, as a result of the formed metal sulfides.

The analysis of the catalyst sulfurized with TNPS gives a sulfur content of 8.50% and a carbon content of 4.2%.

The preceding tests are repeated with TNPS as previously indicated.

However, 45 ml of a 50-50 mixture of white spirits with TNPS are added together with 3% by weight of diketone

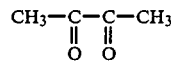

in proportion to TNPS.

At the end of the catalyst activation, the analysis of the catalyst, sulfurized with TNPS, gives a sulfur content of 8.50%. The residual carbon content has been decreased to about 1%. This residual carbon content is also about 1% when using 3% by weight of acetylacetone instead of diketone.

This improved removal of residual carbon results, during the activity test, in better catalytic results as well for hydrodesulfuration as for dehydronitrogenation. Moreover, the stability of these activities is improved, particularly in the long run tests (several hundred hours in pilot units).

TPS 32 treated with or without promoter, as above indicated, provides for similar results.

What is claimed is:

1. A process for the treatment of a new or regenerated catalyst containing (a) a carrier on the basis of at least one metal or metalloid oxide and (b) at least one active metal, said process comprising treating the new or regenerated catalyst "ex situ", externally of a reaction zone, by means of at least one sulfuration agent introduced as a solution in an organic solvent, in the required amount, into the catalyst pores, said agent having the formula:

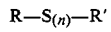

wherein n is an integer from 3 to 20, and radicals R and R', identical or different, are each an organic radical containing 1 to 150 carbon atoms per molecule, said radicals being selected from saturated or unsaturated, linear or branched, alkyl radicals or radicals of the naphthenic type, aryl radicals, alkylaryl radicals and arylalkyl radicals, R' being alternatively a hydrogen atom.

2. A process according to claim 1, for the partial or total sulfurization of an active metal or at least one of the active metals included in the composition of a catalyst containing (a) a carrier on the basis of at least one metal or metalloid oxide and (b) at least one active metal, the sulfurization process being characterized in that, in a first step effected "ex situ" and in the absence of hydrogen, the catalyst is treated with at least one sulfurization agent, so as to incorporate partially or completely said agent in the catalyst pores, the sulfurization agent being a polysulfide of the general formula:

$R-S_{(n)}-R'$ wherein n is an integer from 3 to 20 and R' is either a hydrogen atom or another radical identical to or different from radical R, these two radicals thus being each an organic radical containing 1 to 150 carbon atoms per molecule, these radicals being selected from the group consisting of alkyl radicals, i.e., saturated or unsaturated, linear or branched or of the naphthenic type, aryl radicals, alkylaryl radicals and arylalkyl radicals, said sulfurization agent being used as a solution in a solvent, and in that in a second step, effected "in situ", which is the step of catalyst activation in the presence of hydrogen, the catalyst obtained in the first step is treated with hydrogen to dissociate the polysulfide and to fix the required amount of sulfur on the one or more metals included in the composition of said catalyst.

3. A process according to claim 1, applied either to the treatment of a new catalyst, before its use, or applied to the treatment of a catalyst, prior to its use, said catalyst having just been subjected to a regeneration "ex situ".

4. A process according to claim 1, wherein n (in the formula $R-S_{(n)}-R'$) is an integer from 3 to 8 and each of R and R' contains from 10 to 60 carbon atom per molecule.

5. A process according to claim 1, wherein the sulfurization agent is a ditert-dodecylpolysulfide or ditert-nonpylpolysulfide wherein n is 5.

6. A process according to claim 2, wherein the second step "in situ" of catalyst activation is effected by means of hydrogen with the addition of about 0.1 to 1% by volume of water.

7. A process according to claim 1, wherein said solvent in which is dissolved the sulfurization agent is selected from at least one of the solvents of the group consisting of a light gasoline boiling between about 60° and 95° C., a gasoline of the hexane type boiling between about 63° and 68° C., a gasoline of the so-called F type boiling between about 100° and 160° C. and containing 10 to 20% by volume of aromatic hydrocarbons and a gasoline of the "white spirit" type, boiling between about 150° and 250° C. and containing about 14 to 22% by volume of aromatic hydrocarbons.

8. A process according to claim 1, the process being performed in the presence of from 0.4 to 8% by weight in proportion to the polysulfide weight, of at least one additive selected from the group consisting of aldehydes containing 4 to 14 carbon atoms per molecule, ketones or polyketones containing 3 to 18 carbon atoms per molecule, ethers containing 5 to 14 carbon atoms per molecule, alcohols or polyalcohols containing 5 to 14 carbon atoms per molecule and organic acids or polyacids containing 3 to 14 carbon atoms per molecule.

9. A process according to claim 8, wherein the weight of additive(s) is from 0.8 to 4% with respect to the weight of the one or more polysulfide(s) involved, the additive being selected from the group consisting of acetylacetone, diketone, acetonyl acetone, lactic acid and citric acid.

10. A process according to claim 1 wherein the at least one active metal is molybdenum, tungsten or nickel.

11. A process according to claim 1 wherein the at least one active metal is a noble metal of group VIII of the platinum family.

* * * * *